United States Patent

Henzler

[11] 3,923,282
[45] Dec. 2, 1975

[54] VACUUM VALVE CONSTRUCTION
[75] Inventor: Albert Henzler, Mels, Switzerland
[73] Assignee: Balzers Patent- & Beteiligungs AG, Liechtenstein
[22] Filed: Nov. 22, 1974
[21] Appl. No.: 526,335

[30] Foreign Application Priority Data
Nov. 22, 1973  Switzerland............... 016600/73

[52] U.S. Cl................................. 251/63.4; 251/77
[51] Int. Cl.² ............................................ F16K 31/122
[58] Field of Search........................... 251/77, 63.4

[56] References Cited
UNITED STATES PATENTS

| | | | |
|---|---|---|---|
| 958,716 | 5/1910 | Bard | 251/77 X |
| 2,146,681 | 2/1939 | Kronmiller | 251/77 X |
| 3,382,880 | 5/1968 | Wagner | 251/63.4 X |
| 3,637,187 | 1/1972 | Burger | 251/63.4 X |
| 3,695,578 | 10/1972 | Walther | 251/63.4 X |

*Primary Examiner*—Arnold Rosenthal
*Attorney, Agent, or Firm*—McGlew and Tuttle

[57] ABSTRACT

A vacuum valve includes a valve member or valve shutter which is engageable on a valve seat in a valve housing in order to close off a vacuum connection. The valve shutter is driven by a drive connection which includes a member which is displaceable by either a fluid or spring pressure force and which includes an elastic member connection between the drive member and the valve which is actuated during the last portion of the movement of the drive member in order to hold the valve in a closed position under pressure. The elastic connection comprises cup springs surrounding a bolt member connected between a driving part and a shutter valve with angular cup springs positioned therearound which are compressed after the valve shutter is moved onto its seat. When the drive member moves a predetermined distance after the shutter valve is positioned on its seat this movement is used to actuate a switch for the purpose of operating another control after a hermetic pressure contact of the shutter valve with the valve seat is effected.

5 Claims, 3 Drawing Figures

VACUUM VALVE CONSTRUCTION

BACKGROUND OF THE INVENTION

1. Field of the Invention

This invention relates in general to the construction of valves and in particular to a new and useful vacuum valve which includes a drive connection to seat a valve shutter member on its valve seat having an elastic member between the drive member and the valve seat which is actuated to bias the valve shutter onto its seat after the initial valve seating contact is effected.

2. Description of the Prior Art

The present invention is particularly directed to valves which are used in vacuum operations where it is frequently necessary to provide a signal indicating the opened or closed position of the valve. It is not sufficient that the opened or closed position is evident from the position of a valve handle for example because in most instances an electrical signal is required in order to permit either a remote control operation or a use of the valve in connection with an automatic system. Vacuum valves are commercially available in which an electric switch is provided and which is actuable upon the opening or closing of the valve by the displacement of a valve member. For example the movement of a valve lifting rod may close a switch and thereby produce an electric signal. However such a signal only indicates that for example a closing operation has been started and not whether the result that is a hermetic closure of the valve has actually been achieved. Depending upon the circumstances the result might be frustrated despite the actuation of the switch for example if the drive member is blocked for some reason before the valve shutter has come into engagement with its valve seat with the necessary sealing pressure. Another cause of an incorrect actuation of the switch is for example that in a hydraulic drive mechanism the required contact pressure is not produced at all so that the shutter is applied against the valve seat but the closure is not hermetic.

SUMMARY OF THE INVENTION

In accordance with the present invention there is provided a vacuum valve which is constructed to avoid the above-mentioned disadvantages of the prior art and which provides a signal when it is in a closed state and only after the valve shutter is actually applied against the valve seat with the necessary locking pressure. The invention includes an elastic intermediate member disposed between a drive member and a shutter valve which is of a characteristic rating such that before the driving member applies against the valve shutter a sufficient locking force is produced on the valve shutter against its valve seat to obtain a hermetic pressure contact.

The construction of the invention preferably includes a drive member which is movable to move the valve shutter and which is connected to the valve shutter by a connection which permits a relative replacement between the two in the manner of a lost motion connection. An elastic member such as a cup spring is disposed between the drive member and the spring at the lost motion connection and it is arranged so that it will be actuated that is either tensioned or compressioned as the case may be to provide a closing pressure on the valve shutter against its valve seat. Thus when the drive member initially positions the valve shutter on its valve seat there is an after travel which is obtained by the connection which is used to actuate the spring or elastic member between the drive member and the shutter valve. This elastic pressure is used to produce a locking pressure engagement of the valve shutter on its valve seat. The construction is such that the drive member moves an initial distance to engage the valve shutter on its seat and moves a further distance to actuate the spring means disposed between the drive member and the valve shutter. This further distance of travel is employed for effecting the precise actuation of a switch member and its actuation will only occur after the spring is already actuated.

The present valve elastic connection between the drive member and the valve shutter is an improvement over the known constructions in which an elastic connection between a valve lifting rod and a valve shutter is intended to permit the lateral displacement or tilting movement of the valve shutter during the closing which are necessary for a correct seating in a closed state. In such a case the elastic connection is not for the transmission of a closing pressure and a locking pressure contact to the valve shutter member but only for the purpose of centering. With the inventive arrangement however a locking pressure contact is produced only after the drive member has been moved by a predetermined distance to permit it to transmit the required locking pressure directly to the valve shutter by applying against the elastic member and the elastic member is constructed with a characteristic so that the interconnection pressure will not be either overrated or underrated. The elastic member in the form of a cup spring is advantageously positioned between the drive member and the valve shutter and it is compressed only prior to attaining the locking position and there is no danger that any over travel will be effected.

Accordingly it is an object of the invention to provide an improved vacuum valve construction which includes a valve shutter member which is engageable on a valve seat and which is moved to a closed position by a drive member which is connected to the valve shutter by means of a lost motion connection with an elastic member disposed between the drive member and the valve shutter which is actuated after the valve shutter is engaged on its seat so as to provide a locking force pressure on the valve seat and wherein the movement of the drive member after the valve is first engaged on its seat until it is finally held thereon by an increased locking pressure is effective to actuate a switch for a control circuit.

A further object of the invention is to provide a vacuum valve which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
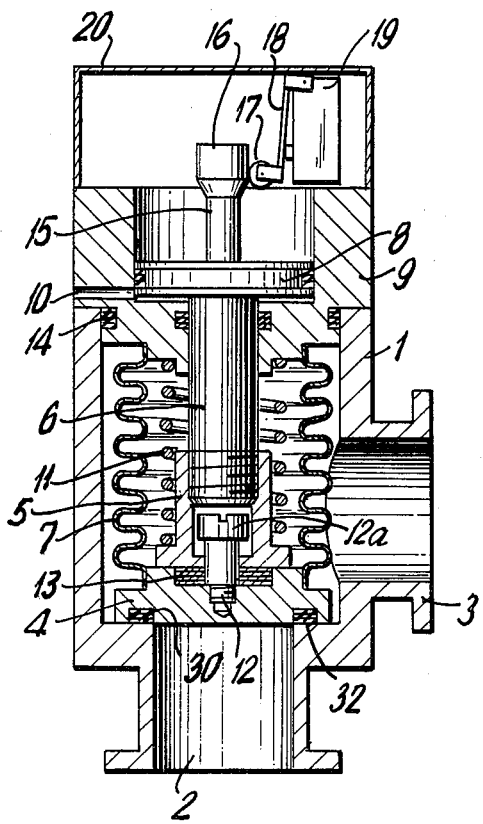
FIG. 1 is a vertical axial sectional view of a vacuum valve constructed in accordance with the invention.

Referring to the drawings in particular the invention embodied therein comprises a valve body or housing 1 having connection ports 2 and 3 for use respectively either as inlets or outlets. A valve seat 30 is defined between the inlet and the outlet and it is closable by a valve shutter or valve member 4 having a resilient sealing portion 32 which is compressed on the seat.

The valve shutter 4 in accordance with the invention is operated by a drive mechanism which includes a lifting rod 6 which is connected at one end to a piston 8 which is movable in a cylinder 9. A pressure conduit 10 connects into the cylinder 9 below the piston 8 in order to lift the piston up. The downward movement of the piston 8 may be effected for example by suitable fluid pressure to the top of the cylinder 9 or by the force of a compression spring 9 which is disposed around the lift rod 6 and engages on a ledge of an engaging piece or hollow insert sleeve 5. The drive members including the lift rod with the engaging piece 5 is connected to the valve shutter 4 by means of a bolt 12 which is threaded at its one end into the valve shutter and which includes another end having a head 12a which is too large to pass through a bore of the engaging piece 5. The bolt 12 with the engaging piece 5 define a lost motion connection between the drive members including the lift rod 6 and the valve shutter 4. For this purpose the engaging piece 5 slides along a central cylindrical surface of the bolt 12. During opening movement the valve 4 is opened against the pressure of the spring 11. At the absence of pressure in the cylinder 9 which may be intentional or due to a disturbance pressure spring 11 closes the valve automatically.

Figure 2:
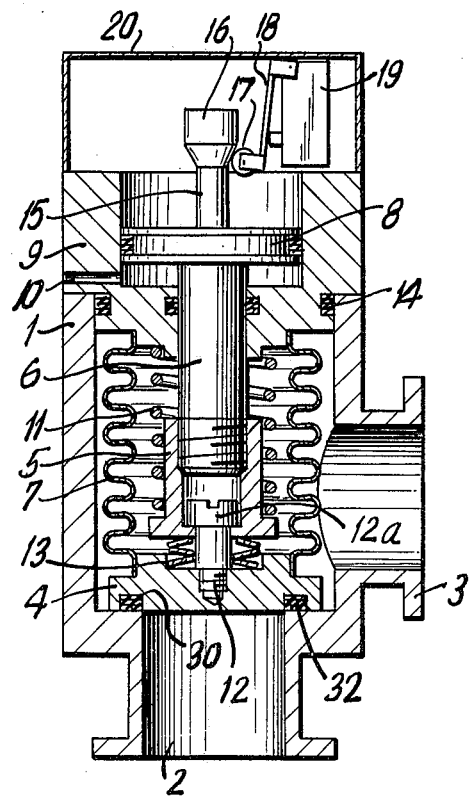
FIG. 2 is a view similar to FIG. 1 but with the valve in a position before the valve shutter is placed under closing pressure.

The lost motion connection in accordance with the invention also includes an elastic member in the form of cup springs 13 which engage around the bolt 12 between the engaging piece 5 and the shutter valve 4. The spring characteristic of the cup spring 13 is chosen so that in a very short stroke of movement of the engaging piece 5 toward the valve shutter 4 the springs are capable of being actuated to transmit a locking force necessary for a hermetical closing of the valve shutter 8 on its associated valve seat 30. During the valve closing operation, first the valve shutter 4 is applied against the valve seat 30 as shown in the position of FIG. 2. As the drive members in the form of the valve rod 6 continues to exert a downward pressure through the engaging teeth 5 on the elastic member or springs 13 the springs are actuated, that is compressed and this compression force is built up into a locking pressure on the valve shutter 4. During the time at which compression of the spring takes place there is a distance through which the drive member in the form of the rod 6 and the engaging piece 5 may move which of course will vary on the spring stiffness and the chosen amount of prestressing that is necessary for a hermetic locking of the valve. This travel distance covered by the drive members is used to actuate a position indicator or suitable control. For this purpose the valve includes an actuating switch 18 contained in a housing 19 which includes a roller 17 at the end of the switch which is engaged by a cam 16 which is secured to a rod 15 connected to the piston 8. This control mechanism is all located within a cover 20 at one end of the valve and the whole mechanism may be accurately positioned in respect to the switch for actuation of the switch at a precise position of the drive members. This precise position may be adjusted varying the amount at which the bolt 12 is screwed into the valve shutter 4. This preadjustment may also effect a prestressing of the springs 13 even when the valve is still open if so desired. This prestressing will be transformed into an additional compression occurring at the closure. A spring force is obtained which is close to or even equal to the locking pressure. The result is that practically the entire travel during the spring compression is effective as an after travel during which a locking force is applied to the valve shutter on its valve seat 30. Experience has shown that in order to obtain a reliable actuation of the switch 18 the after travel of the drive mechanism may for example be from one to two millimeters.

Figure 3:
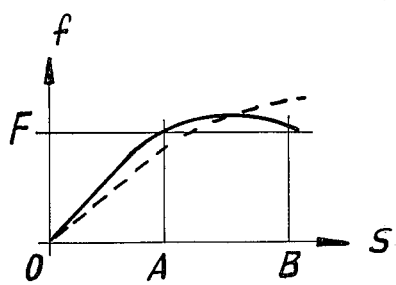
FIG. 3 is a curve indicating the stroke of the valve drive member and the force of the closing spring.

In the preferred form a spring 13 is employed which has a particular spring characteristic which may be shown for example in reference to FIG. 3 in which the spring force f is plotted against the stroke s (spring compression travel). Advantageously a spring member is employed which has a characteristic in which a linear portion OA is followed by a relatively flat shape within the range AB and this spring member is used with a prestressing such that at the opening and closing of the valve, the working range coincides with the portion AB. At the point A the spring force should be great enough to approximately equal the locking force F.

Aside from the previously mentioned advantages of a long after travel another advantage is to be noted that after hermetic closure of the valve as the drive member continues to move the locking pressure does not appreciably increase and therefore it is not necessary to provide a drive force substantially exceeding the force needed to produce the locking pressure.

The valve drive parts including the lift rod 6 and the engaging piece 5 and the elastic spring 13 are enclosed within a spring bellows 7. The lower portion of the valve body is advantageously sealed with a packing 14 against atmosphere.

While a specific embodiment of the invention has been shown and described in detail to illustrate the application of the principles of the invention, it will be understood that the invention may be embodied otherwise without departing from such principles.

What is claimed is:

1. A vacuum valve construction, comprising a valve housing having an inlet and a discharge spaced from said inlet, means defining a valve seat between said inlet and said outlet, a valve shutter engageable on said valve seat to close said seat, a valve drive connected to said shutter to close and open said valve shutter and including a drive member having a lost motion connection to said valve shutter and being relatively movable in respect thereto up to a predetermined amount, and an elastic intermediate member between said drive member and said valve shutter in a position to be actuated by closing pressure of said drive member during at least a portion of the travel movement of said drive member during the closing thereof to provide a locking force acting on said valve shutter to obtain a hermetic pressure contact of said valve shutter against said valve seat, said drive member including a hollow cylindrical drive part having a closed end with a bore therethrough adjacent said valve shutter, a bolt extending through the bore having a head confining it against movement through said bore and having an opposite end extending through said bore which is connected to said valve shutter, said cylindrical intermediate portion being movable along said bolt, and a cup spring surrounding said bolt between said cylindrical intermediate portion and said valve shutter, said drive member including a lift rod connected to said intermediate cylindrical member, a piston carried on said lift rod at the end thereof opposite said cylindrical intermediate member, said valve having a cylindrical housing in which said piston is movable, means to pressurize respective sides of said cylinder in which said piston is movable for the movement of said drive member, said piston having a cam extension, and a switch having a switch actuating member with a roller follower disposed in the path of movement of said cam extension and being movable thereby only when said drive member is acting on said spring to stress said spring to effect a hermetic pressure closing force.

2. A vacuum valve according to claim 1, wherein said elastic intermediate member is prestressed up to approximately the closing pressure of said valve.

3. A vacuum valve according to claim 1, wherein said elastic intermediate member comprises a cup spring.

4. A vacuum valve according to claim 1, including an electric switch having a switch actuating portion, said drive member including a portion movable against said switch to actuate said switch only after said valve shutter is seated on said valve seat and before full closing pressure is applied thereto.

5. A vacuum valve construction, comprising a valve housing having an inlet and a discharge spaced from said inlet, means defining a valve seat between said inlet and said outlet, a valve shutter engageable on said valve seat to close said valve seat, a valve drive for driving said shutter, said valve drive including a drive plunger being movable in said housing, a second drive part connected to said shutter, and an intermediate drive member connected to said drive plunger for movement therewith and having a lost motion connection to said second drive part, said intermediate drive member comprising a part slidably engaged on said second drive part and movable between limits defined by abutment of a portion of said intermediate member with said second drive part and abutment of said intermediate member with said shutter, said drive plunger having a cam extension, an elastic member disposed between said intermediate member and said valve shutter in a position to be actuated by closing pressure of said drive plunger during the closing of said valve shutter to provide a locking force acting on said valve shutter to obtain a hermetic pressure contact of said valve shutter against said valve seat, and a switch having a switch actuating member with a roller follower disposed in the path of movement of said cam extension and being movable thereby only when said drive plunger is acting on said spring through said intermediate member to effect a hermetic pressure closing force.

* * * * *